United States Patent [19]

Nagashima et al.

[11] Patent Number: 4,586,588
[45] Date of Patent: May 6, 1986

[54] CHAIN SAW SAFETY-BRAKE SYSTEM

[75] Inventors: Akira Nagashima, Kawasaki; Toshio Taomo, Tokyo, both of Japan

[73] Assignee: Kioritz Corporation, Tokyo, Japan

[21] Appl. No.: 634,763

[22] Filed: Jul. 26, 1984

[30] Foreign Application Priority Data

Aug. 1, 1983 [JP] Japan .................. 58-140709

[51] Int. Cl.⁴ ............................................. F16D 49/10
[52] U.S. Cl. .................................. 188/77 R; 30/381; 188/166; 188/196 M
[58] Field of Search ................ 188/77 R, 166, 196 M, 188/196 J; 30/381

[56] References Cited

U.S. PATENT DOCUMENTS

| 2,195,829 | 4/1940 | Shreffler | 188/166 |
| 3,776,331 | 12/1973 | Gustafsson | 188/166 |
| 3,923,126 | 12/1975 | Bidanset | 188/77 W |
| 3,937,306 | 2/1976 | Naslund et al. | 188/77 R |
| 4,026,392 | 5/1977 | Hirschkoff | 188/166 |
| 4,121,339 | 10/1978 | Nikolich | 188/77 R X |
| 4,156,477 | 5/1979 | Nagashima et al. | 188/77 R |
| 4,286,695 | 9/1981 | Grattapaglia | 188/77 R X |
| 4,310,972 | 1/1982 | Isberg et al. | 188/77 R X |
| 4,359,144 | 11/1982 | Coleman et al. | 188/77 R |
| 4,474,269 | 10/1984 | Kloberg et al. | 30/381 X |
| 4,493,400 | 1/1985 | Nagashima et al. | 30/381 X |

FOREIGN PATENT DOCUMENTS

| 845455 | 7/1952 | Fed. Rep. of Germany .... 188/77 R |
| 3232775 | 3/1984 | Fed. Rep. of Germany .... 188/77 R |
| 1059551 | 11/1953 | France .............................. 188/77 R |
| 5716935 | of 0000 | Japan . |

Primary Examiner—George E. A. Halvosa
Attorney, Agent, or Firm—Sheridan Neimark; Karl W. Flocks; A. Fred Starobin

[57] ABSTRACT

A chain saw safety-brake system including a pivotable member, and a screw located in side-by-side relation to the pivotable member and having a brake band connected thereto at one end. The screw can be operated from outside of the chain saw to adjust the length of the brake band. The pivotable member and the screw are assembled with a lock lever for locking a clutch drum and contained in a casing to provide a packaged unit.

1 Claim, 1 Drawing Figure

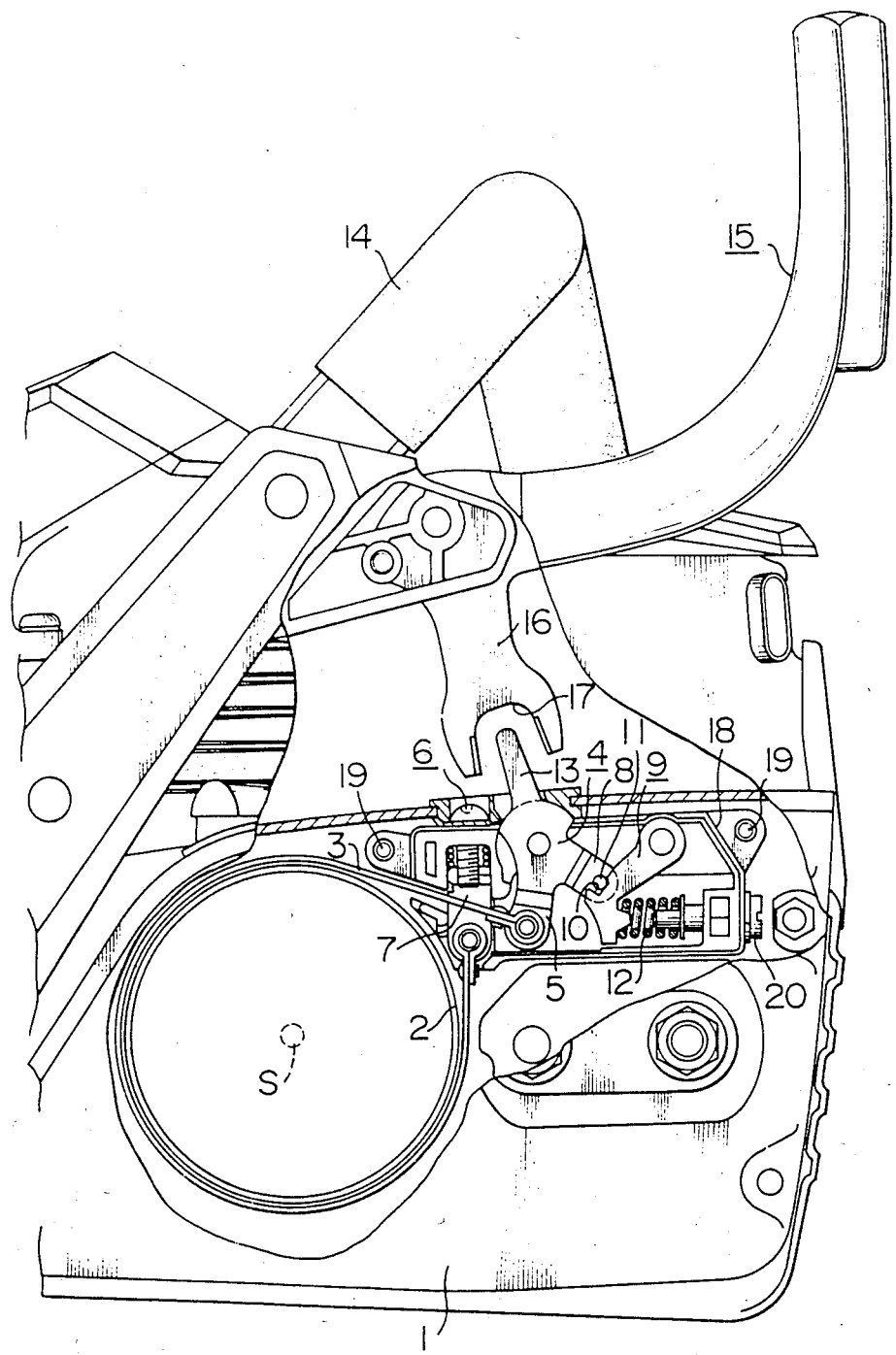

1

CHAIN SAW SAFETY-BRAKE SYSTEM

BACKGROUND OF THE INVENTION

This invention relates to a chain saw safety-brake system.

When a chain saw is operated to cut trees, for example, by moving a saw chain at high speed, the saw chain might produce a reaction if it is inadvertently brought into contact with a knot in the trunk or branch of a tree and the chain saw itself might be flung toward the operator in what is referred to as a kickback phenomenon. When this phenomenon occurs, the chain saw flung toward the operator by the reaction would cause a serious injury to the operator if it contacted the operator because the saw chain is in high-speed operation. This gives rise to the problem of how to prevent the occurrence of the kickback phenomenon which is a matter of life or death to the operator. To obviate this problem, proposals have been made to use various types of safety-brake system. Since the safety-brakes of the prior art for the chain saws are built in bodies of chain saws, difficulties have been experienced in adjusting or repairing, for example, the brake band and effecting maintenance of parts and replacing them by new ones after the safety-brakes have been assembled with the chain saws. Also, the brake handle has had its vibration amplified by the vibration of the engine of the chain saw, thereby causing the parts of the safety-brake including the brake band to vibrate at an inordinately high magnitude. In addition, even if the operator grips the handles of the chain saw firmly in normal operation, the brake might inadvertently be actuated when there is no need to apply the brake, thereby causing danger to the operator.

SUMMARY OF THE INVENTION

This invention has been developed for the purpose of obviating the aforesaid disadvantages of the prior art. Accordingly, the invention has as its object the provision of a chain saw safety-brake system best utilized as a packaged unit in which all components are in a self-contained assembly to facilitate assembling and maintenance, and the vibration of the brake handle is kept from being directly transmitted to the safety-brake system and adjustments of the length of the brake band can be readily effected.

To enable the aforesaid object to be accomplished, the invention provides the outstanding features including a pivotable member having an arm located in spaced juxtaposed relation to a lower end portion of a brake lever of a brake handle pivotably connected to a front handle and operated when the brake lever is actuated, one leg of a bifurcation having connected thereto one end of a brake band trained over an outer periphery of a clutch drum of a centrifugal clutch for driving a saw chain and the other leg of the bifurcation prevented from moving in pivotal movement by a lock lever, and a screw connected to the other end of the brake band for adjusting the length of the brake band and arranged in side-by-side relation to the pivotable member to enable the screw to be actuated from outside of the chain saw. The pivotable member, the lock lever and the screw being contained in a casing.

In the chain saw safety-brake system including the aforesaid features according to the invention, the brake handle and the pivotable member are out of contact with each other in normal operation of the chain saw and the pivotable member, lock lever and brake band adjusting screw are contained in the casing to provide a packaged unit, and the brake handle is connected to the front handle which is rendered free from vibration, to thereby minimize influences exerted by the vibration of the engine on the brake handle. Also, the risk of the component parts of the safety-brake system being subjected to vibration which is amplified by the brake handle and inadvertently released from neutral condition or the risk of the component parts producing a chattering sound can be avoided. The provision of the safety-brake system as a packaged unit facilitates prevention of dust, assembling, disassembling, inspection, repair, replacing of the system as a whole by a new one, and maintenance. The length of the brake band can be adjusted readily from outside of the chain saw by means of a driver without requiring to disassemble the system.

BRIEF DESCRIPTION OF THE DRAWING

The single drawing is a sectional side view of the safety-brake system of a chain saw comprising one embodiment of the invention, showing its essential portions.

DESCRIPTION OF THE PREFERRED EMBODIMENT

A preferred embodiment of the invention will now be described by referring to the accompanying drawing.

The brake system according to the invention is located in the vicinity of a clutch drum 2 of centrifugal clutch means mounted at an output shaft S of a chain saw body 1. The clutch drum 2 has mounted at the periphery of a boss of a shaft thereof a saw chain drive sprocket wheel, not shown, to drive a saw chain. Thus, by braking the clutch drum 2, it is possible to bring the saw chain to a halt. More specifically, a brake band 3 is trained over the outer periphery of the clutch drum 2 and supported at one end thereof by one leg 5 of a bifurcation of a pivotable member 4 and at the other end thereof by a movable plate 7 having a screw 6 threadably connected thereto. The other leg 8 of the bifurcation of the pivotable member 4 has a pin 11 received in a notch 10 formed in a lock lever 9, to thereby keep the pivotable member 4 from moving in pivotal movement. To keep the pin 11 received in the notch 10 in a locked condition, a spring 12 urges the lock lever 9 to move clockwise by its biasing force, and the pivotable member 4 is urged by the biasing force of the spring 12 through the lock lever 9 to move counterclockwise in pivotal movement. Thus, if the pin 11 received in the notch 10 in a locked condition is unlocked, then the pivotable member 4 is moved counterclockwise at high speed by the biasing force of the spring 12, to thereby pull the brake band 3 and tighten its grip on the outer periphery of the clutch drum 2 and apply the brake thereto. The pivotable member 4 has at its upper portion an arm 13 which is disposed in spaced-apart relation to a lower end portion of a brake lever 16 of a brake handle 15 pivotably connected to a front handle 14 and normally kept in a neutral position as by a click stop mechanism, not shown. More specifically, the arm 13 is received in a notch 17 formed at the lower end of the brake lever 16 with a certain clearance between the arm 13 and the notch 17, and the brake handle 15 is normally kept in the illustrated position to bring the pivotable member 4 out of contact with the brake handle 15 during normal operation of the chain saw. The pivotable member 4, the screw 6, the spring 12 and the lock lever 9 are all assembled in a casing 18 as a packaged unit which is removable from the chain saw body 1 together with the brake band 3. The casing 18 is detachably screwed to the chain saw body 1 as indicated at 19. If it is desired to adjust the length of the brake band 3 to regulate the braking condition after the safety-brake system is built in the chain saw body 1, it can be done by rotating the screw 6 using, for example, a driver from outside of the chain saw to thereby move the movable plate 7 without requiring to disassemble the brake system, because the head of the screw 6 faces outwardly. The biasing force of the spring 12 can be regulated by rotating a screw 20 from outside.

Operation of the safety-brake system of the aforesaid construction will now be described. Assume that a forward end of a guide bar, not shown, for the saw chain is brought into contact with an obstacle during operation and a reaction is produced in the saw chain travelling at high speed, with a result that a forward end portion of the chain saw body 1 and the guide bar are violently repulsed by the reaction and flung toward the operator while the saw chain is still travelling at high speed. When this phenomenon occurs, the brake handle 15 is moved clockwise by its own inertia or by the hand of the operator gripping the front handle 14 striking it, and the arm 13 of the pivotable member 4 is moved counterclockwise by the notch 17 of the brake lever 16. As a result, the pin 11 at the leg 8 of the pivotable member 4 crosses over the notch 10 of the lock lever 9 to thereby unlock the pivotable member 4. At the same time, the pivotable member 4 moved counterclockwise by the brake handle 15 through the notch 17 of the brake lever 16 is accelerated in its counterclockwise pivotal movement by the biasing force of the spring 12 urging the lock lever 9, to thereby pull the brake hand 3 supported by the leg 5 and apply the brake to the clutch drum 2.

Then, after the brake is applied, the brake should be released again. To this end, the brake handle 15 is moved counterclockwise against the biasing force of the spring 12. This loosens the brake band 3 trained over the clutch drum 2, to release the brake that has been applied to the brake drum 2. Stated differently, the arm 13 of the pivotable member 4 in the notch 17 of the brake lever 16 is moved clockwise to bring the pin 11 at the leg 8 into engagement in the notch 10 of the lock lever 9, to bring the pivotable member 4 to a neutral position again.

What is claimed is:

1. A chain saw safety-brake system on a chain saw with a front handle comprising:

a pivotable member including an arm disposed in spaced-juxtaposed relation to a lower end portion of a brake lever of a brake handle pivotably connected to the front handle and actuated by the brake lever as it is moved pivotally, one leg of a bifurcation of the pivotable member connected to one end of a brake band trained over an outer periphery of a clutch drum of a centrifugal clutch for driving a saw chain, and the other leg of the bifurcation kept from moving in pivotal movement by a lock lever;

a screw located in side-by-side relation to the pivotable member and connected to the other end of the brake band a casing containing the pivotable member, the lock lever and the screw in an assembled condition to provide a packaged unit detachably secured to the chain saw, said screw positioned for manipulation from outside of said casing to adjust the length of said brake band.

* * * * *